Patented June 19, 1945

2,378,817

UNITED STATES PATENT OFFICE 2,378,817

PRODUCING OIL

Gilbert G. Wrightsman and Stuart E. Buckley, Houston, Tex., assignors to Standard Oil Development Company, a corporation of Delaware No Drawing. Application May 23, 1942, Serial No. 444,252

9 Claims. (Cl. 166—22)

The present invention is directed to a method for consolidating incompetent producing formations traversed by a borehole.

In the production of liquids such as oil and water, the producing formation is often incompetent. That is to say, the formation comprises unconsolidated particles, the most common example being a producing water or oil sand. Heretofore, in obtaining desired fluids from such formations, it has been difficult to prevent the entrainment of particles from the formation in the fluid entering the well bore. In many producing fields even the strainers having the finest openings commercially available do not prevent the passage of sand particles into the producing string. The sanding of the strainer and the cavity immediately adjacent the strainer results in a greatly decreased production and repeated maintenance operations.

It is an object of the present invention to consolidate incompetent formations adjacent a well bore.

More specifically, it is an object of the present inventoin to place a cementing agent into direct contact with grains of naturally unconsolidated formation and displace a portion of the cementing material to provide passages between the grains for conducting fluid through the formation. A preferable method of achieving this result is by employing a cementing agent in conjunction with an agent which renders the sand preferably wetted by the cementing material. The cementing agent coats the grains of the naturally unconsolidated formation with films which extend from one grain to another to consolidate the formation.

In a typical oil-producing formation or oil sand, the particles of sand are covered by a film of water and the interstices between the grains of sand are occupied by petroleum. When producing from such a formation, the flow of oil adjacent the borehole will carry the unconsolidated particles of sand into the well bore. In many cases, the amount of formation carried along into the bore becomes progressively greater as the well produces more and more water. It is thought that this condition is due to disruption of physical forces due to the increased flow of water.

The usual method of practicing the present invention is by removing the film of water from the particles of the formation by employing a suitable agent, and then coating the particles with a cementing material. A preferred cementing material is that which may be placed in position as a fluid and which will chemically react under the conditions prevailing in the formation to form an oil and water insoluble resin. The agent employed is one which will cause the sand to be preferentially wetted by the cementing material, which usually means that the agent will render the sand preferentially oil wet. It will be understood that while this agent is, in effect, a wetting agent, it is not to be confused with the so-called commercial wetting agents which render a material preferably water wet. The agent suitable for practicing the present invention must be selected with reference to the particular cementing material employed, so that the sand will be preferentially wetted by the selected cementing material. The agent may be forced into the formation either in advance of the cementing material or, optionally, may be mixed with the cementing material so that it enters the formation simultaneously therewith. After the liquid treating material has been placed in position in the formation, a flow of fluid is induced through the formation to open up passages between the particles, leaving the cementing material as a film on the particles. Since portions of the particles will be in contact with each other the film will, in effect, be continuous from one particle to the next throughout the treated portion of the formation. This procedure will allow the unconsolidated materials adjacent the well bore to be consolidated and, at the same time, any decrease in the permeability resulting from the treatment will be small.

A preferred method of practicing the present invention is as follows: A material or mixture capable of reacting to form a water-insoluble resin, such as a phenol formaldehyde resin, is admixed with an agent such as a higher aliphatic amine, to form a solution. This solution is forced into a selected portion of an unconsolidated formation by any of the methods conventionally used for placing treating agents in boreholes. Generally a sufficient amount of treating mixture to consolidate the formation to the extent of one foot from the borehole is desirable. After the resin-forming material has been placed, it is followed by a neutral liquid, such as oil or water, to flush the resin-forming material from the interstices between the sand grains to leave them open for fluid flow. It will be understood that it is impossible to remove completely any fluid from a sand by flowing a dissimilar material through the sand, and that the effect of the flushing liquid will be to remove material from passages between the sand grains, leaving a film of the resin-forming material on the grains. A sufficient amount of the flushing liquid will be forced through the formation to prevent the setting up of a solid barrier of the resin at any point in the formation. It will be understood that, as the resin is forced outwardly, it will coat the formation grains, and that the use of sufficient flushing fluid will cause the clearing of the passages throughout the treated portion of the formation, leaving the consolidating material as a film on the grains. As a factor of safety, it is generally desirable to use three or four times as much flushing material as is theoretically necessary to insure the retention of suitable permeability by the formation. After forcing the neutral liquid into the formation, the direction of flow will be reversed and production will be allowed at a relatively slow rate to retain the porosity of the formation while the injected material is reacting to form a hard resin. After a suitable time has elapsed for the formation of the resin, the well may be allowed to produce at any desired rate or closed in, at the option of the operator.

Processes for forming resins suitable for practicing the present invention are well known. In the example given in which a phenol formaldehyde resin was employed, a mixture of phenol, formalin, and a catalytic agent such as caustic soda may be forced into the formation and retained there until the ingredients have reacted to form a resin. It is more desirable, however, to initiate the reaction at the surface of the earth under suitable temperature conditions which allows control of the polymerization time. The product of the reaction is an oily liquid phase which may be separated by settling and may be employed as the material which will react in the earth to form a resin.

It has been found preferable to employ with the cementing material from 1 to 5% by weight of the agent capable of rendering the sands wettable by the cementing material. The amount of cementing material employed may be varied over a wide range. It may be stated generally, however, that the most satisfactory results are obtained when, after the treatment has been completed, the cementing material occupies from 10 to 60% of the original pore space of the formation. It will be understood, however, that larger and smaller amounts will produce satisfactory results.

Classes of cementing materials which have been found suitable in practicing the present invention are the thermal-setting type of resins, including phenol formaldehyde resins, alkyd resins, vinyl type resins, polystyrene resins, and acrylic acid resins.

Various agents are commercially available which may be employed in conjunction with the cementing materials. For example, the aforementioned aliphatic amines, having a long carbon chain, are suitable. Other suitable types are sulfonated higher alcohols, sulfonated naphthenic acids and the heavy metal soaps. The specific materials above enumerated are capable of rendering sands preferentially oil-wet and allow the above listed resins to come into direct physical contact with the sands. It will be understood that an agent should be selected which will render the sand wettable by the cementing material to be employed.

In the above example the employment of a single phase solution, including a cementing material and an agent capable of rendering the sand wettable by the cementing material, was described. Optionally, the agent and a suitable cementing material may be introduced separately. It will be understood that when following this procedure a quantity of the agent will be forced down the bore of the well and, immediately following it, will be a quantity of cementing material. In the preferred embodiment the cementing material will be followed by a neutral flushing agent, such as oil or water.

As another method of practicing the present invention, the employment of a neutral liquid to force the excess cementing agent farther out into the borehole may be omitted, and immediately after the resin-forming material has been placed in the well it may be allowed to produce, the liquid from the formation acting to flush the excess resin-forming material into the borehole of the well to clear fluid-carrying passages in the formation.

As another modification of the present invention, a suitable fluid may be employed to dry the particles of the formation and a cementing material then forced into the formation so that it will come into direct physical contact with the particles thereof. If desired, a gas may be blown through a selected formation to remove water therefrom and a resin-forming mixture then allowed to come in contact with the dried formation. Passages are then opened through the formation in the manner above described. Instead of using a gas, a suitable liquid, such as alcohol, may be flushed through the formation to displace water therefrom, the drying liquid being followed by a quantity of cementing material and passages opened through the cemented sand grains by a suitable flushing agent, for example, gas.

Having fully described the present invention, what we desire to claim is:

1. A method of consolidating wetted incompetent sands of a producing formation penetrated by a borehole, comprising the steps of impregnating the formation with an oily material capable of forming a resin within the formation and an agent capable of rendering the particles of the formation preferentially wettable by said resin-forming material, removing a portion of said resin-forming material before it has formed a solid resin to leave passages in the formation and a coating of said material on the grains of the formation, and allowing said well to produce at a slow rate until the material remaining within the formation has been converted into a resin.

2. A method in accordance with claim 1 in which the agent is forced into the formation ahead of the material capable of reacting to form a resin.

3. A method in accordance with claim 1 in which the agent and the material capable of forming a resin are added to the formation as a single liquid phase.

4. A method of consolidating a wetted incompetent producing formation traversed by a borehole, comprising the steps of impregnating the formation with an oily material capable of reacting within the formation to form a resin insoluble in the formation fluid and an agent capable of rendering the particles comprising the formation preferentially wettable by said resin-forming material, subsequently forcing a neutral liquid into said formation to flush said resin-forming material from spaces between the particles of the formation to open passages through said formation, and subsequently reversing the flow of fluid through said formation to produce liquid from said formation into the borehole.

5. A method in accordance with claim 4 in which the resin-forming material and the agent are added as a single liquid phase.

6. A method in accordance with claim 4 in which the agent is added to the formation as one phase and is followed by the material capable of forming a resin as a second phase.

7. A method in accordance with claim 4 in which the amount of agent used is from 1% to 5% by weight of the material capable of reacting to form a resin.

8. A method for consolidating a wetted incompetent formation penetrated by a borehole comprising the steps of impregnating the formation with an oily liquid material capable of forming a resin within the formation and an agent capable of rendering the particles of the formation preferentially wettable by said resin-forming material and removing a portion of the resin-forming material from the formation before it has formed a solid resin to produce minute passages between the particles of the formation.

9. A method in accordance with claim 1 in which the agent is an aliphatic amine having a long carbon chain.

GILBERT G. WRIGHTSMAN.
STUART E. BUCKLEY.